(12) United States Patent
Uchiyama et al.

(10) Patent No.: US 6,224,398 B1
(45) Date of Patent: *May 1, 2001

(54) IC CARD CONNECTOR AND IC CARD CONNECTOR MOUNTING STRUCTURE

(75) Inventors: Atsushi Uchiyama; Masato Kobayashi, both of Miyagi-ken (JP)

(73) Assignee: Alps Electric Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/336,419

(22) Filed: Jun. 17, 1999

(30) Foreign Application Priority Data

Jun. 22, 1998 (JP) ................. 10-174419

(51) Int. Cl.[7] .................................. H01R 12/00
(52) U.S. Cl. ................. 439/79; 439/64; 439/83
(58) Field of Search .................. 439/78, 79, 80, 439/64, 82, 83

(56) References Cited

U.S. PATENT DOCUMENTS

| | | | |
|---|---|---|---|
| 5,176,523 | * 1/1993 | Lai | 439/64 |
| 5,504,994 | 4/1996 | Banakis et al. | |
| 5,827,076 | * 10/1998 | Chen | 439/79 |
| 5,980,272 | * 11/1999 | McHugh et al. | 439/79 |

* cited by examiner

*Primary Examiner*—Hien Vu
*Assistant Examiner*—Truc Nguyen
(74) *Attorney, Agent, or Firm*—Brinks Hofer Gilson & Lione

(57) ABSTRACT

In the IC card connector of the present invention, a single supporting projection is provided on a bottom wall of a housing, so when the housing is put on a circuit board, it can be supported at three points: one point of the supporting projection and two points of terminal portions of pin terminals. Therefore, even in the event of a difference in height of the supporting projection, there is no fear of the terminal portions being lifted and it is possible to keep the terminal portions close to a conductive pattern, whereby the terminal portions can be soldered to the conductive pattern in a reliable manner.

3 Claims, 3 Drawing Sheets

IC CARD CONNECTOR AND IC CARD CONNECTOR MOUNTING STRUCTURE

BACKGROUND OF THE INVENTION

1. Field of the Invention

The present invention relates to an IC card connector to be mounted in an apparatus of which use requires insertion and ejection of the IC card, as well as an IC card connector mounting structure.

2. Description of the Prior Art

The construction of a conventional IC card connector will be described with reference to FIGS. 5 and 6.

A housing 21, which is formed by molding with use of a synthetic resin, comprises a base portion 21*a*, a pair of side walls 21*b* extending to the front side from both sides of the base portion 21*a*, a bottom wall 21*c* formed so as to provide a connection between the paired side walls 21*b*, a pair of vertical through holes 21*d* formed near both transverse ends of the base portion 21*a*, a pair of lugs 21*e* formed on the lower surface of the base portion 21*a* in proximity to the holes 21*d*, and a pair of projections 21*f* projecting downward at positions near both transverse ends of the bottom wall 21*c*.

A plurality of metallic pin terminals 22, each have a contact portion 22*a* located at a front position and a terminal portion 22*b* located at a rear position. The plural pin terminals 22 are embedded in the base portion 21*a* of the housing 21 so as to be arranged side by side and extend longitudinally of the housing 21.

In the pin terminals 22 thus mounted to the housing 21, the contact portions 22*a* extend forward of the housing, while the terminal portions 22*b*, which are L-shaped, project backward from the bottom of the housing 21.

The IC card connector thus constructed is mounted into an apparatus of which use requires insertion and ejection of the IC card. A mounting structure for the IC card connector will be described with reference to FIGS. 7 and 8. A circuit board 23 used in the apparatus has holes 23*a* and a desired conductive pattern 24 formed on the upper surface thereof.

The lugs 21*e* of the housing 21 are inserted into the holes 23*a* of the circuit board 23 to effect positioning of the housing, then in this state the paired projections 21*f* are brought into abutment with the upper surface of the circuit board 23 and the terminal portions 22*b* projecting backward from the bottom of the housing 21 are brought into abutment with the conductive pattern 24.

The terminal portions 22*b* of the plural pin terminals 22 are arranged transversely in a row on the bottom of the housing 21. The terminal portions 22*b* are slightly different in the amount of downward projection from the housing bottom, and one terminal portion 22*b* which is the largest in the amount of downward projection is in abutment with the conductive pattern 24.

That is, as shown in FIG. 8, the IC card connector disposed on the circuit board 23 is supported at three points which are the two points of the paired projections 21*f* on the housing 21 side and one point of the one terminal portion 22*b* on the pin terminal 22 side.

Next, a creamy solder (not shown) is applied to the terminal portions 22*b* and the conductive pattern 24 and thereafter the connector-board combination is conveyed to a reflow soldering apparatus, allowing the creamy solder to be melted to solder the terminal portions 22*b* to the conductive pattern 24.

After the soldering, mounting members (not shown) such as screws are inserted into the holes 21*d* of the housing 21 and further into holes formed in the circuit board 23 to secure the housing strongly to the circuit board. Thus the mounting of the housing is completed.

An IC card (not shown) is inserted into the housing 21 of such an IC card connector so as to come into contact with the contact portions 22*a* of the pin terminals 22.

In fabricating the housing 21, there usually occur variations due to a mold error during molding, shrinkage of a synthetic resin used, or a dimensional error during machining, with consequent difference in the height of the paired projections 21*f*.

When the housing 21 is put on the circuit board 23, if the right-hand projection 21*f* is higher than the left-hand projection 21*f* in FIG. 8, the right-hand side of the housing 21 rises a larger distance from the circuit board 23 than the left-hand side thereof.

Consequently, the terminal portions 22*b* of the pin terminals 22 mounted on the right-hand side of the housing 21 are also spaced largely away from the conductive pattern 24, thus resulting in that the soldering becomes unsatisfactory.

According to the conventional IC card connector and the IC card connector mounting structure, since the paired projections 21*f* are formed on the housing 21, there occurs a difference in height between the projections 21*f* when the housing 21 is put on the circuit board 23. The terminal portions 22*b* of the pin terminals 22 located on the associated side become largely spaced from the conductive pattern 24 and are therefore not soldered to the same pattern to a satisfactory extent.

SUMMARY OF THE INVENTION

According to the first arrangement adopted by the present invention for solving the problem, there is provided an IC card connector including a housing formed by molding with use of a synthetic resin, the housing having a base portion and a bottom wall, and a plurality of pin terminals attached to the housing and each having a contact portion and a terminal portion. A single supporting projection projecting downward is formed on the bottom wall of the housing, the plural pin terminals are attached to the base portion of the housing so as to be arranged side by side in the transverse direction of the housing while each extending in the longitudinal direction of the housing, and the terminal portions of the pin terminals are projected backward from the bottom of the housing.

According to the second arrangement adopted by the invention there is provided, in combination with the above first arrangement, an IC card connector wherein the supporting projection is formed at a central position in the transverse direction of the bottom wall of the housing.

According to the third arrangement adopted by the invention there is provided, in combination with the above first arrangement, an IC card connector wherein the supporting projection is formed at a position opposed to a central portion of the plural pin terminals arranged side by side in the transverse direction of the housing.

According to the fourth arrangement adopted by the invention there is provided, in combination with the above first arrangement, an IC card connector wherein projections lower than the supporting projection are formed on the bottom wall of the housing in such a manner that the supporting projection is positioned between the lower projections.

According to the fifth arrangement adopted by the invention there is provided a structure for mounting an IC card connector. The IC card connector includes a housing formed by molding with use of a synthetic resin. The housing has a base portion and a bottom wall, a plurality of pin terminals attached to the housing and each having a contact portion and a terminal portion, and a single downwardly projecting, supporting projection formed on the bottom wall of the housing, the plural pin terminals being secured to the base portion of the housing so as to be arranged side by side in the transverse direction of the housing while each extending in the longitudinal direction of the housing, and the terminal portions of the pin terminals being projected backward from the bottom of the housing, the IC card connector mounting structure including a circuit board having a conductive pattern and wherein the single supporting projection is brought into abutment with the upper surface of the circuit board and at least two of the terminal portions projecting backward are brought into abutment with the upper surface of the conductive pattern.

According to the sixth arrangement adopted by the invention there is provided, in combination with the above fifth arrangement, an IC card connector mounting structure wherein the supporting projection is formed at a central position in the transverse direction of the bottom wall of the housing and is brought into abutment with the upper surface of the circuit board.

According to the seventh arrangement adopted by the invention there is provided, in combination with the above fifth arrangement, an IC card connector mounting structure wherein the supporting projection is formed at a position opposed to a central portion of the plural pin terminals arranged side by side in the transverse direction of the housing.

According to the eighth arrangement adopted by the invention there is provided, in combination with the above fifth arrangement, an IC card connector mounting structure wherein, out of the plural pin terminals arranged side by side in the transverse direction of the housing, at least two positioned at both transverse end portions of the housing or in the vicinity thereof are brought into abutment with the upper surface of the conductive pattern.

According to the ninth arrangement adopted by the invention there is provided, in combination with the above fifth arrangement, an IC card connector mounting structure wherein projections lower than the supporting projection are formed on the bottom wall of the housing in such a manner that the supporting projection is positioned between the lower projections, the lower projections being brought into abutment with the upper surface of the circuit board when the housing is mounted to the circuit board by means of a mounting member such as screws.

DETAILED DESCRIPTION OF PREFERRED EMBODIMENTS

Figure 1:
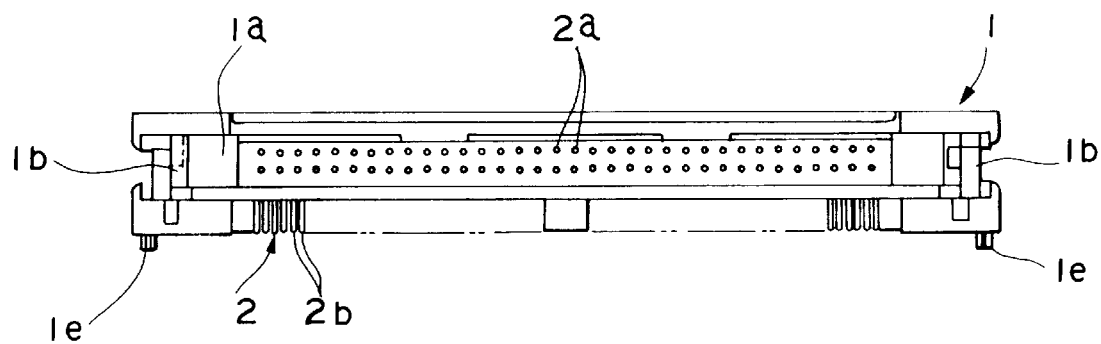
FIG. 1 is a front view of an IC card connector according to the present invention.
Figure 3:
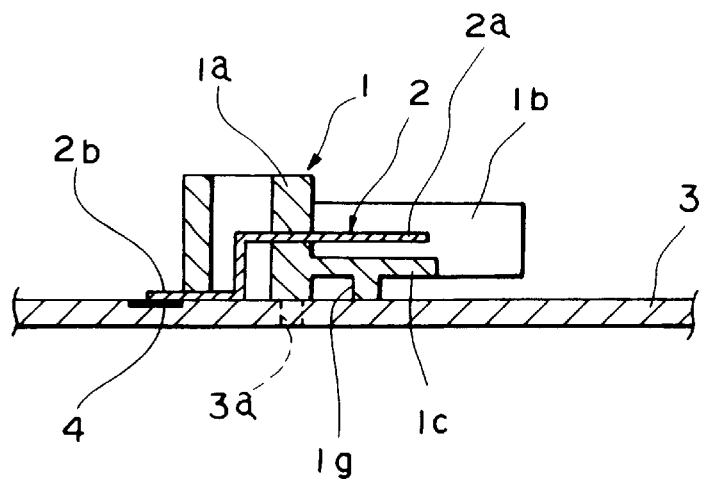
FIG. 3 is a sectional view showing a principal portion of an IC card connector mounting structure according to the present invention.
Figure 4:
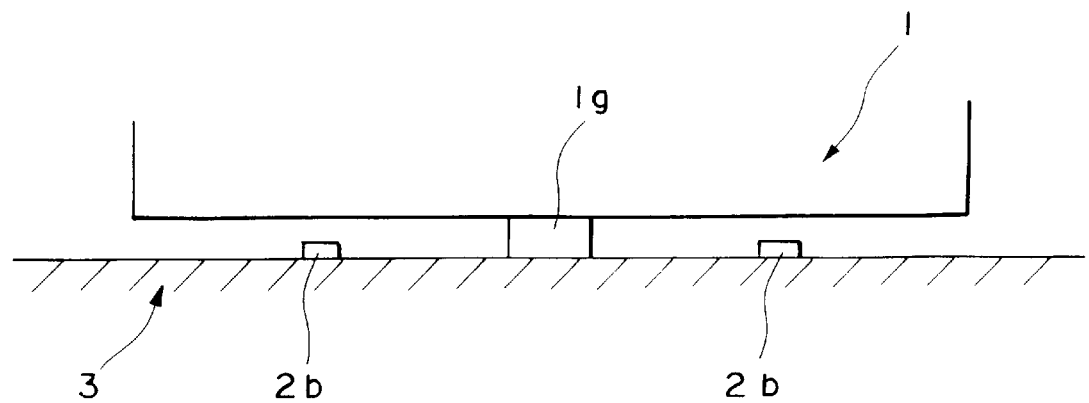
FIG. 4 is an explanatory view of the IC card connector mounting structure.
Figure 5:
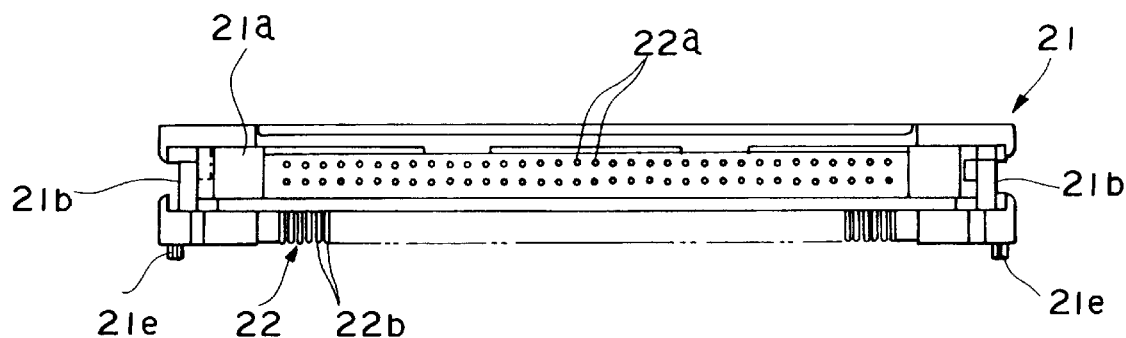
FIG. 5 is a front view of a conventional IC card connector.
Figure 6:
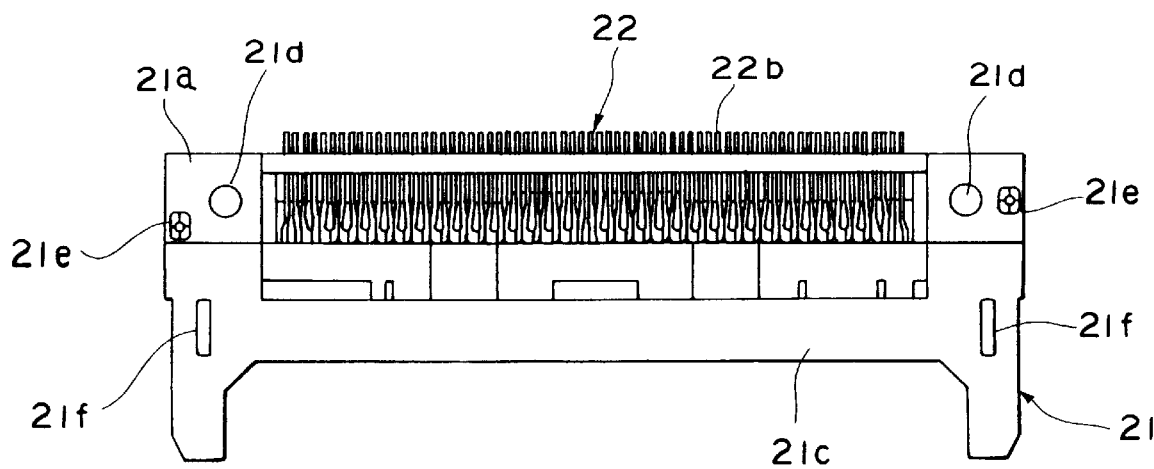
FIG. 6 is a bottom view thereof.
Figure 7:
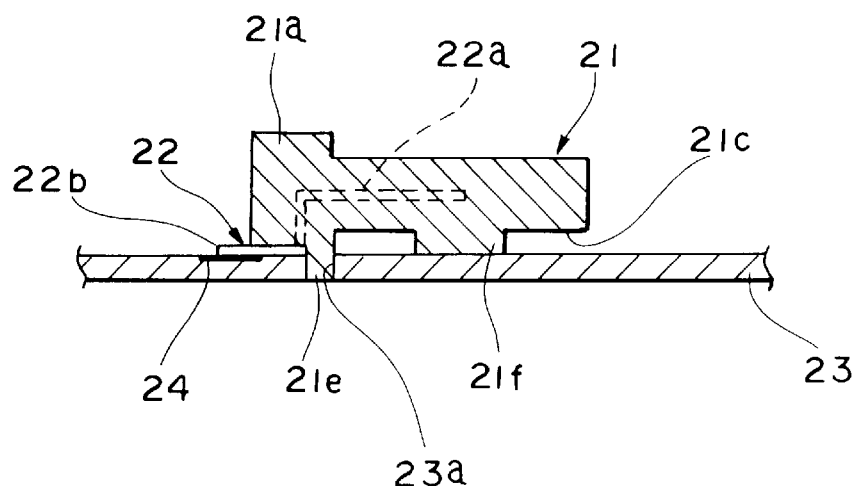
FIG. 7 is a sectional view of a principal portion showing a conventional IC card connector mounting structure.
Figure 8:
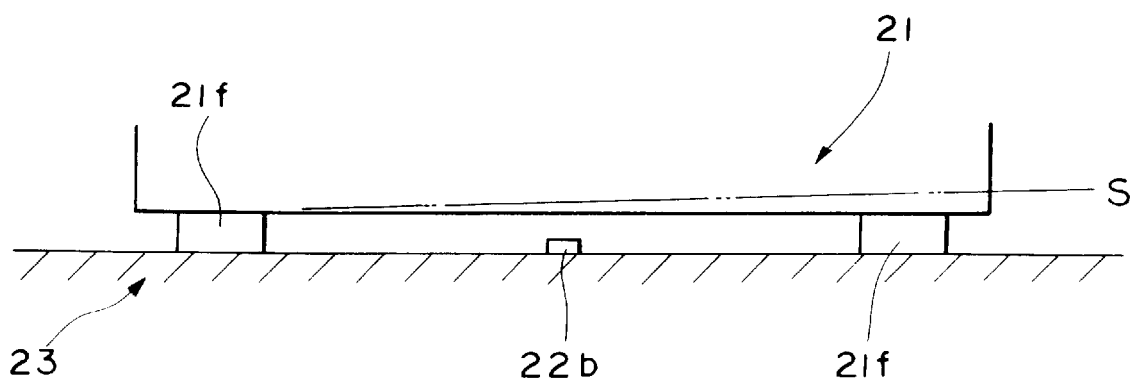
FIG. 8 is an explanatory view showing the conventional IC card connector mounting structure.

An IC card connector and an IC card connector mounting structure both according to the present invention will be described hereinunder with reference to FIGS. 1 to 4. FIG. 1 is a front view of the IC card connector, FIG. 2 is a bottom view thereof, FIG. 3 is a sectional view of a principal portion showing the IC card connector mounting structure, and FIG. 4 is an explanatory view showing the IC card connector mounting structure.

Figure 2:
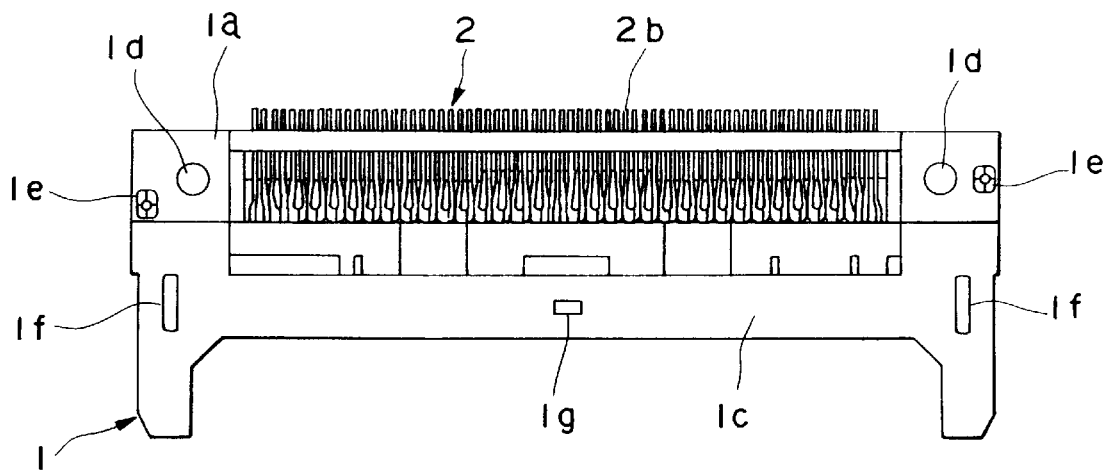
FIG. 2 is a bottom view thereof.

With reference to FIGS. 1 and 2, description will be directed to the construction of the IC card connector according to the present invention. A housing 1, which is formed by molding with use of a synthetic resin, comprises a base portion 1a, a pair of side walls 1b extending forward from both sides of the base portion 1a, a bottom wall 1c formed so as to provide a connection between the paired side walls 1b, a pair of vertical through holes id formed near both transverse ends of the base portion 1a, a pair of lugs 1e formed on the lower surface of the base portion 1a, a pair of projections 1f projecting downward in the vicinity of both transverse ends of the bottom wall 1c, and a single supporting projection 1g projecting downward at a transversely central position of the bottom wall 1c.

The supporting projection 1g is positioned between the paired projections 1f and is formed higher than the projections 1f.

The position of the supporting projection 1g is not limited to the transversely central position of the bottom wall 1c. It may be located at any other position between the paired projections 1f.

A plurality of metallic pin terminals 2 are each provided with a contact portion 2a and a terminal portion 2b. The pin terminals 2 are embedded in the base portion 1a of the housing 1 while being arranged side by side in the transverse direction of the housing so that their contact portions 2a are positioned in front and their terminal portions 2b in the rear and so that they each extend in the longitudinal direction of the housing.

When the pin terminals 2 are attached to the housing 1, their contact portions 2a extend forward of the housing and their terminal portions 2b, which are L-shaped, are projected backward from the lower surface of the housing.

The one supporting projection 1g may be formed on the bottom wall 1c at a position opposed to a central portion of the plural pin terminals which are arranged side by side transversely.

The IC card connector thus constructed is mounted into an apparatus of which use requires insertion and ejection of an IC card. The mounting structure for the IC card connector will be described with reference to FIGS. 3 and 4. A circuit board 3, which is used in the apparatus, has holes 3a and a desired conductive pattern 4 formed on the upper surface of the board.

With the lugs le of the housing 1 inserted and positioned into the holes 3a of the circuit board 3, the high supporting projection 1g is brought into abutment with the upper surface of the circuit board 3 and the terminal portions 2b projecting. backward from the lower surface of the housing 1 are brought into abutment with the upper surface of the conductive pattern 4.

The terminal portions 2b of the plural pin terminals 2, which are arranged in order transversely on the lower surface of the housing 1, are slightly different in the amount of downward projection from the housing lower surface, and two terminal portions 2b largest in the amount of downward projection are in abutment with the conductive pattern 4.

Thus, as shown in FIG. 4, the IC card connector put on the circuit board 3 is supported at three points which are one point of the supporting projection 1g located on the housing 1 side and two points of the two terminal portions 2b located on the pin terminal 2 side.

As to the two-point support by the two terminal portions 2b, if, out of the plural pin terminals 2 arranged side by side in the transverse direction, two pin terminals 2 are positioned at both transverse ends or thereabouts are used, the IC card connector is supported more stably on the circuit board 3 and all the terminal portions 2b become closer to the conductive pattern 4.

The contact of the terminal portions 2b with the conductive pattern 4 is made through the terminal portions abutted with the conductive pattern, but in the event the abutted terminal portions are deflected by the weight of the housing 1 and other terminal portions 2b adjacent to the deflected terminal portions come into contact with the conductive pattern 4, more than two terminal portions 2b can be abutted against the conductive pattern.

Next, a creamy solder (not shown) is applied to the terminal portions 2b and the conductive pattern 4 and thereafter the connector-board combination is conveyed to the reflow soldering apparatus, in which the creamy solder is melted to solder the terminal portions 2b to the conductive pattern 4.

After the soldering, mounting members (not shown) such as screws are inserted into the holes 1d of the housing 1 and further into holes formed in the circuit board 3, allowing the housing 1 to be secured strongly to the circuit board by the mounting members. The housing mounting operation is completed.

When the housing 1 is thus mounted, the projections 1f lower than the supporting projection 1g is in abutment with the upper surface of the circuit board 3 to prevent bending of the bottom wall 1c.

An IC card (not shown) is inserted into the housing 1 so that it comes into contact with the contact portions 2a of the pin terminals 2 in the IC card connector thus constructed.

When the housing 1 is put on the circuit board 3, as set forth above and as shown in FIG. 4, the IC card connector is supported at three points which are two points of two terminal portions 2b located on the pin terminal 2 side and one point of one supporting projection 1g located on the housing 1 side, so even in the event there occurs a difference in height of the supporting projection 1g due to variations in size of the housing 1, there is no fear of the terminal portions 2b being lifted and it is possible to keep the terminal portions 2b close to the conductive pattern 4. Thus, the soldering can be done in a satisfactory manner.

As will be seen from the above description, the following effects are attained by the present invention.

In the IC card connector according to the present invention, since one supporting projection 1g is provided on the bottom wall 1c of the housing 1, when the connector is put on the circuit board, it can be supported at three points: one point of the one supporting projection 1g and two points of two terminal portions 2b of the pin terminals 2. Even in the event there occurs a difference in height of the supporting projection 1g, it is not likely to the terminal portions 2b to be lifted. Therefore, it is possible to keep the terminal portions 2b close to the conductive pattern 4, thus ensuring a satisfactory execution of the soldering work.

Besides, by providing a single supporting projection 1g centrally in the transverse direction of the bottom wall 1c, the housing 1 can be placed stably on the circuit board 3, so that the terminal portions 2b and the conductive pattern 4 can be soldered to each other in a satisfactory manner.

Moreover, by providing a single supporting projection 1b on the bottom wall 1c of the housing 1 at a position opposed to a central portion of the plural pin terminals 2 which are arranged transversely side by side, the housing and the terminal portions 2b can be placed in a stable state, thus making it possible to effect soldering of the terminal portions 2b and the conductive pattern 4 to a satisfactory extent.

Further, by providing projections 1f lower than the supporting projection 1g on the bottom wall 1c in such a manner that the supporting projection 1g is positioned between the lower projections 1f, when the housing 1 is mounted onto the circuit board 3 by means of mounting members, the lower projections 1f come into abutment with the upper surface of the circuit board, whereby it is possible to prevent bending of the housing bottom wall 1c, thus permitting smooth insertion and ejection of an IC card.

Further, since the two-point support by terminal portions 2b is effected using two pin terminals 2 located at both transverse ends of the housing or thereabout out of plural pin terminals 2 arranged transversely side by side, the IC card connector is supported more stably on the circuit board 3 and all the terminal portions 2b become closer to the conductive pattern 4. It is possible to effect soldering in a reliable and satisfactory manner.

What is claimed is:

1. An IC card connector comprising:

a housing formed by molding with use of a synthetic resin, said housing having a base portion and a bottom wall; and a plurality of pin terminals arranged side by side on the base portion, wherein each pin terminal has a contact portion contactable to an IC card and a terminal portion solderable to a substrate board to fix IC card connectors, the terminal portion projects rearward from a lower surface of the housing, the contact portion is embedded in the base portion above the bottom wall of the housing;

a single supporting projection projecting downward is formed on said bottom wall of the housing, the single supporting projection is disposed below the contact portion of at least one pin terminal, forward of a row of the terminal portions of the plurality of pin terminals, and opposite to substantially a center of the row of the terminal portions, and the housing is supported at three points on the substrate board by the single supporting projection and two of the terminal portions of the plurality of pin terminals having the largest amount of protrusion downward from the lower surface of the housing, the supporting projection is disposed, in the direction of the row, between the two of the terminal portions.

2. An IC card connector mounting structure, said IC card connector comprising:

a housing formed by molding with use of a synthetic resin, said housing having a base portion and a bottom wall;

a plurality of pin terminals arranged side by side on the base portion; and a single downwardly projecting, supporting projection formed on said bottom wall of the housing, said IC card connector mounting structure further comprising a circuit board having a conducting pattern, wherein each pin terminal have a contact portion contactable to an IC card and a terminal portion solderable to a substrate board to fix IC card connectors, the terminal portion projects rearward from a lower surface of the housing, the contact portion is embedded in the base portion above the bottom wall of the housing, the single supporting projection is disposed forward of a row of the terminal portions of the plurality of pin terminals, and opposite to substantially a center of the row of the terminal portions, said single supporting projection is brought into abutment with an upper surface of said circuit board, and two terminal portions of two pin terminals having the largest amount of protrusion downward from the bottom wall of the housing from among the plurality of pin terminals and the supporting projection, disposed in the direction of the row, between the two terminal portions are brought into abutment with an upper surface of said conductive pattern, thereby supporting the housing at at least three points on the circuit board by the single supporting projection and the two portions of the plurality of pin terminals.

3. An IC card connector mounting structure according to claim 2, wherein, out of said plurality of pin terminals arranged side by side in a transverse direction of the housing, two terminal portions of said pin terminals having the largest amount of protrusion downward from the bottom wall of the housing positioned proximate to both transverse end portions of the housing, respectively, are brought into abutment with the upper surface of said conductive pattern.

* * * * *